United States Patent [19]

Garrett

[11] 4,076,198

[45] Feb. 28, 1978

[54] MOBILE HOME TELEPHONE STAKE

[76] Inventor: Deloris Garrett, 4331 N. McKinley, Oklahoma City, Okla. 73118

[21] Appl. No.: 689,488

[22] Filed: May 24, 1976

[51] Int. Cl.² .............................................. H02G 9/02
[52] U.S. Cl. ....................................... 248/49; 174/38; 248/121; 248/156
[58] Field of Search ................... 248/49, DIG. 6, 121, 248/156, 122, 65; 174/38; 339/122 R; 256/DIG. 5, 10

[56] References Cited

U.S. PATENT DOCUMENTS

| | | | |
|---|---|---|---|
| 1,173,036 | 2/1916 | Robidoux | 248/156 X |
| 2,162,636 | 6/1939 | Peoples | 248/156 X |
| 2,701,700 | 2/1955 | Williamson | 248/156 X |
| 3,164,668 | 1/1965 | Skubal | 174/38 X |
| 3,180,920 | 4/1965 | Fletcher et al. | 174/38 |
| 3,502,785 | 3/1970 | Nickola | 248/156 X |
| 3,751,575 | 8/1973 | Barb | 174/38 X |
| 3,868,080 | 2/1975 | Olson | 248/300 X |
| 3,872,234 | 3/1975 | Smith | 174/38 |
| 3,928,712 | 12/1975 | Sears | 174/38 |
| 3,960,353 | 6/1976 | Leutwyler | 248/DIG. 6 X |

Primary Examiner—Roy D. Frazier
Assistant Examiner—Rodney H. Bonck
Attorney, Agent, or Firm—Edwin H. Crabtree; John H. Widdowson

[57] ABSTRACT

A mobile home telephone stake used with an underground telephone cable for receiving the end thereof and attaching the cable to a junction box mounted on a mounting plate secured to the stake. The mounting plate is designed to receive a number of different telephone cable junction boxes without the need of drilling apertures in the plate.

3 Claims, 4 Drawing Figures

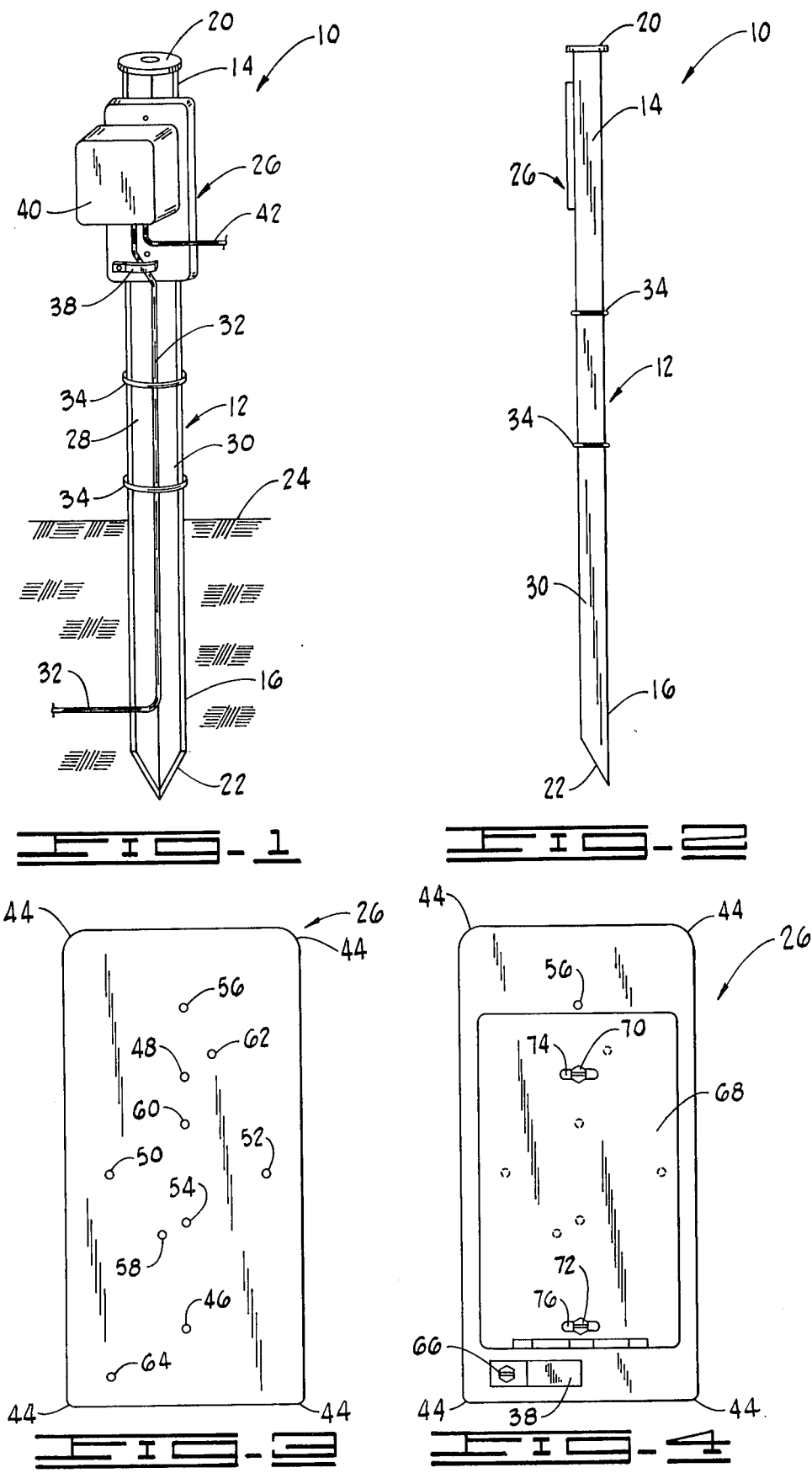

MOBILE HOME TELEPHONE STAKE

BACKGROUND OF THE INVENTION

This invention relates generally to a metal stake used in conjunction with underground cables, and more particularly, but not by way of limitation, to a mobile home telephone stake used with a telephone cable for providing telephone service to a mobile home.

Heretofore there have been various types of mounting pedestals for supporting an electrical junction box, telephone box, television jack, or the like and attached to the underground cable. The mounting pedestals are generally designed for a particular type of junction box, meter, etc. and are not designed for threadably receiving telephone cable junction boxes made by different manufacturers.

None of the prior art mounting pedestals disclose the novel structure of the subject invention as described herein.

SUMMARY OF THE INVENTION

The subject invention is simple in design, yet rugged in construction. The mobile home telephone stake is lightweight and is easily installed into the ground surface for quickly attaching an underground telephone cable to a telephone junction box mounted thereon. The stake is painted a bright orange color so that it can be easily seen at day or night.

The telephone stake provides a metal mounting plate having a plurality of apertures. The apertures are positioned on the mounting plate in a spaced relationship for threadably receiving various makes of junction boxes eliminating the necessity of having to drill holes in the mounting plate.

The invention includes an elongated V-shaped metal post having a pointed lower end portion for ease in driving the stake into the ground. A flat metal washer is welded to the top of an upper end portion to provide a striking surface for driving the stake into the ground surface. Flexible ties are wrapped around the V-shaped metal post thereby holding the cable against the insides of the post for protecting the cable.

The mobile home telephone stake includes an elongated V-shaped metal post having a pointed lower end portion and an upper end portion with a flat metal washer attached thereto. A mounting plate is attached to the metal post below the upper end portion of the post. The mounting plate includes a plurality of apertures. The apertures are positioned in a spaced relationship on the mounting plate for threadably receiving different manufactured junction boxes.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the mobile home telephone stake mounted in the ground surface with a telephone junction box mounted thereon.

FIG. 2 is a side view of the mobile home telephone stake.

FIG. 3 is a front view of the mounting plate.

FIG. 4 is a front view of the mounting plate with a back plate of a telephone junction box mounted thereon.

DETAILED DESCRIPTION OF THE DRAWINGS

In FIG. 1 the mobile home telephone stake is designated by general reference numeral 10. The stake 10 includes a metal post 12 having upper end portion 14 and lower end portion 16. The upper end portion 14 includes a flat metal washer 20 welded to the top of the upper end portion 14. The washer 20 provides a bearing surface for driving the stake 10 into the ground with a hammer and protects the stake 10 from being bent. The lower end portion 16 of the metal post 12 includes a pointed portion 22 used for ease in driving the post 12 into a ground surface 24. The stake 10 further includes a metal mounting plate 26 attached to the metal post 12 and disposed below the upper end portion 14 of the metal post 12. The metal post 12 has an elongated V-shaped cross section formed by the intersection of a first side portion 28 and a second side portion 30.

In this view the stake 10 can be seen with the lower end portion 16 driven into the ground surface 24 and receiving an underground telephone cable 32 inside the V-shaped cross section of the metal post 12 and disposed adjacent the side portions 28 and 30. The underground cable 32 is retained against the sides 28 and 30 of the V-shaped metal post 12 and along its length by the use of flexible ties 34 which are secured around the metal post 12.

The end of the underground cable 32 is held in place on the metal mounting plate 26 by a tie-down clamp 38. The end of the cable 32 is received inside a telephone junction box 40 which is threadably attached to the mounting plate 26. A second telephone cable 42 is attached to the junction box 40 and is received in the mobile home for providing telephone service thereto.

In FIG. 2 a side view of the telephone stake 10 can be seen. In this view the flat metal mounting plate 26 is shown attached to the upper end portion 14 of the metal post 12 and to the outer edges of side portions 28 and 30. The mounting plate 26 is disposed below the metal washer 20 to protect the mounting plate 26 when the flat washer 20 is used for driving the stake 10 into the ground surface 24.

Also seen in this view are a pair of the flexible ties 34 secured around the metal post 12 for holding the underground telephone cable 32 inside the V-shaped metal post 12. The ties 34 are carbon filled nylon for resistance and durability to various weather conditions.

In FIG. 3 a front view of the metal mounting plate 26 is illustrated. The mounting plate 26 includes rounded edges 44 for safety purposes to prevent the tearing or snagging of clothing during the installation of the stake 10.

The mounting plate 26 includes a plurality of apertures which are positioned in a spaced relationship on the mounting plate 26 for threadably receiving various types of manufactured junction boxes which are common in use and standard in underground telephone installations. By providing the apertures in a specific spaced relationship on the mounting plate 26 the drilling of holes in the mounting plate 26 for mounting the junction box thereon is eliminated.

For example, apertures 46 and 48 can be used for threadably receiving the junction box 40. Apertures 50 and 52 can be used for receiving a junction box made by a different manufacturer. Similarly, apertures 54 and 56 can be used for a manufacture of again a different type of junction box. Apertures 58, 60 and 62 are also used in various combinations for receiving the junction boxes which are standard in the industry. While some apertures like apertures 50 and 52 may be used by only one type of junction box, aperture 54 which is centrally positioned on the mounting plate 26 may be used in combination with a number of the other apertures for more than one different type of junction box. Aperture 64 is used for receiving a threaded screw 66 shown in FIG. 4 and used to secure the tie-down clamp 38 to the plate 26.

In FIG. 4 a front view of the mounting plate 26 is again illustrated and includes a back plate 68 of the junction box 40 threadably attached by screws 70 and 72. The screws 70 and 72 are threaded into apertures 46 and 48.

It can be appreciated that by lining up apertures 74 and 76 in the back plate 68 of the junction box 40 with the corresponding apertures 46 and 48 in the mounting plate 26, the back plate 68 can be quickly attached and removed from the stake 10.

Changes may be made in the construction and arrangement of the parts or elements of the embodiments as disclosed herein without departing from the spirit or scope of the invention defined in the following claims.

I claim:

1. A mobile home telephone stake used with an underground telephone cable, the end of the cable received in a junction box mounted on the stake, an additional telephone cable is attached to the junction box and received in the mobile home for providing telephone service thereto, the telephone stake comprising:

an elongated metal post having a first side portion and a second side portion, said side portions intersecting, forming a "V" shaped cross section, said side portions having outwardly extending edges, said post having an upper end portion, a center portion, and a lower end portion, said lower end portion having a pointed end for inserting said post in the ground surface;

a flat mounting plate, the back of said plate attached to the outwardly extending edges of said first and second side portions of said post, said plate disposed below the top of the upper end portion of said post, the sides of said plates extending outwardly from the first and second side portions of said post, said mounting plate including a plurality of sets of apertures in a spaced relationship thereon, each of said sets of apertures threadably receiving mounting fasteners of a particular make of junction box;

a flat washer attached to the top of the upper end portion of said post and extending outwardly therefrom, said washer used for striking the upper end portion of the telephone stake and driving the stake into the ground surface; and flexible ties secured around the exterior of said first and second side portions of said post for holding the underground telephone cable against the interior sides of said first and second side portions of said post.

2. The stake as described in claim 1, further including a tie-down clamp secured to the front of said mounting plate for securing a portion of the underground telephone cable to said mounting plate.

3. The stake as described in claim 1, wherein said mounting plate includes rounded edges of the corners of said plate for preventing the tearing and shagging of clothing during the installation of the stake.

* * * * *